United States Patent [19]
Roe

[11] Patent Number: 5,371,921
[45] Date of Patent: Dec. 13, 1994

[54] CASTER BRAKE

[73] Assignee: American Caster Corporation, Los Angeles, Calif.

[21] Appl. No.: 42,696

[22] Filed: Apr. 5, 1993

[51] Int. Cl.⁵ .............................................. B60B 33/00
[52] U.S. Cl. ...................................... 16/35 R; 16/47; 188/1.12
[58] Field of Search ................. 16/35 R, 47; 188/1.12

[56] References Cited

U.S. PATENT DOCUMENTS

| | | | |
|---|---|---|---|
| 3,914,821 | 10/1975 | Screen | 16/35 R |
| 4,550,808 | 11/1985 | Folson | 16/35 R |
| 4,664,231 | 5/1987 | James | 16/35 R |
| 4,681,192 | 7/1987 | James | 16/35 R |
| 4,843,677 | 7/1989 | Shane | 16/35 R |
| 4,911,269 | 3/1990 | Perl | 16/35 R |

FOREIGN PATENT DOCUMENTS

| | | | |
|---|---|---|---|
| 3429834 | 2/1986 | Germany | 16/35 R |
| 1584745 | 2/1981 | United Kingdom | 16/47 |
| 2074024 | 10/1981 | United Kingdom | 16/47 |
| 2132478 | 7/1984 | United Kingdom | 16/47 |

Primary Examiner—Lowell A. Larson
Assistant Examiner—Donald M. Gurley
Attorney, Agent, or Firm—Charles H. Thomas

[57] ABSTRACT

A caster for supporting an object on wheels is provided with a brake that is operable between engageable and disengageable positions. The brake alternatively restricts and permits rotation of the caster wheel relative to a moveable swivel element. The brake includes a brake pad operated by movement of an operating member located externally on the operating components of the caster. A detent system provides detents for alternatively holding the brake in both the engaged and disengaged positions.

6 Claims, 1 Drawing Sheet

CASTER BRAKE

BACKGROUND OF THE INVENTION

1. Field of the Invention

The present invention relates to an improvement to casters that are used to provide rolling support for objects. The improvement resides in the provision of a simple but effective caster brake.

2. Description of the Prior Art

Casters are utilized to provide rolling support for a wide variety of objects used in many different commercial, industrial, institutional and residential applications. In industry casters are utilized to support racks of goods in warehouse facilities in such diverse environments as supporting metal parts for degreasing, painting and drying and for trays of bakery goods. In commercial applications casters support typewriter stands, computer furniture, chairs and delivery carts, as well as many other structures. Institutional furniture in hospitals is supported on casters. For example, hospital beds employ casters, as do the tray stands that are wheeled to the sides of hospital beds from which bedridden patients eat. In homes, chairs and other furniture, such as baby cribs and walkers are supported by casters.

In virtually all applications the advantage of mounting articles on casters is that objects can be moved far more quickly and easily by rolling them across a floor on casters, rather than pushing or lifting them.

One significant disadvantage which exists with respect to conventional casters is the absence of some simple but effective braking mechanism. For example, with baby furniture such as cribs and walkers it is quite convenient to roll a crib or permit an infant to propel a walker at times. However, at other times the fact that such furniture and other objects can be moved so rapidly and easily presents a safety hazard. For example, a baby in a crib, can, by bouncing in the crib, propel the crib on casters to dangerous locations, such as to the top of a flight of stairs. The same is true of an infant unattended in a walker. Likewise, in a hospital environment it is quite convenient to be able to roll a serving tray stand to the bedside of a patient, but disconcerting to the patient when even very light forces applied to the tray stand during the consumption of a meal cause the stand to roll away on its casters.

SUMMARY OF THE INVENTION

A primary object of the present invention is to provide a caster with a simple, but effective brake which can be easily engaged or disengaged by a user. A further very important object of the invention is to provide a caster brake without unduly increasing the cost of construction of the caster.

Another important object of the invention is to provide a caster braking mechanism which will maintain a consistent braking force when applied over a period of time despite wear on the caster wheels.

A further object of the invention is to provide a caster brake which does not require extensive or significant alterations in the size or shape of an otherwise conventional caster.

In one broad aspect the invention may be considered to be an improvement to a caster having a mounting swivel including a base element and a moveable element. The movable element is rotatable relative to the base element about a vertical axis, and a wheel is mounted to the moveable element of the swivel for rotation about a horizontal axis. According to the improvement of the invention a brake is provided which is engageable and disengageable to alternatively restrict and permit rotation of the wheel of the caster relative to the moveable swivel element.

The invention may also be considered to be a caster for providing rolling support for a structure. The caster employs a swivel connection comprising a base element joined to the structure and a rotatable element mounted on the base element and rotatable relative thereto about a vertical axis. At least one wheel is mounted to the rotatable element for rotation about a horizontally disposed axis of rotation. A releasable and engageable brake is mounted on the rotatable element and includes a brake pad for frictionally engaging the wheel when the brake is engaged. A detent means is interposed between the rotatable element and the wheel for alternatively holding the brake pad in an engaged position and in a released position relative to the wheel.

In the preferred embodiment of the invention the brake includes a brake pad and a pad carrying means for moving the brake pad into contact with the wheel and for withdrawing the bake pad from contact with the wheel. The preferred type of pad carrying means is comprised of a lever arm joined to the moveable element of the swivel at a lever fulcrum having an axis of rotation displaced from and parallel to the horizontal axis of rotation of the wheel. A detent means is preferably provided for selectively latching the lever arm in an engaged position in which the brake pad resides in contact with the wheel and a disengaged position in which the brake pad is withdrawn from contact with the wheel.

With prolonged use the radially outermost rolling surface of a wheel will experience some surface degradation. This is particularly true if the caster wheel is formed of some inexpensive material, such as plastic. The outer rolling surface of the wheel will become pitted and may even develop minor flat spots which, though not serious enough to disrupt the caster's primary function of rolling across a surface, is nevertheless significant enough to create irregularities in braking force if the brake pad is engaged with the radially outer surface of the wheel. For this reason it is advisable for the pad of the brake of the invention to be applied to some moveable surface of the wheel other than the radially outermost rolling surface thereof.

The brake pad can be disposed so as to move parallel to the axis of rotation the wheel, in which case the braking force is applied against the surface of the wheel hub. Preferably, however, the wheel is constructed with a hub and a wheel rim at the periphery of the hub. The wheel rim has an outer rolling surface and a radial inner surface that projects from the hub coaxially about the horizontal axis of rotation of the wheel. The brake pad can then be moved radially outwardly relative to the axis of the wheel to make contact with the wheel at the radially inner surface of the wheel rim. The inner surface of the wheel rim does not undergo damage due to rolling across a floor as does the outer rim surface. Therefore, the frictional force with which the brake pad engages the wheel is likely to remain far more uniform and unchanging with use than if the brake pad is applied to the rolling surface of the wheel.

Preferably also the moveable or rotatable element of the swivel has a hood that shrouds the upper portion of wheel and the brake includes an operating element which carries the brake pad.. The operating element of the brake may be a lever arm which includes a free extremity that extends beneath the hood and then alongside the hood, whereby the brake is operable externally of-the hood. This allows the hood to shield the wheel and swivel mechanisms from dirt and debris that could otherwise clog the caster operation. Furthermore, the hood serves to shield the brake pad mechanism and inhibit damage to its operating components as well.

Economy of manufacture is a highly important aspect to caster construction. Accordingly, it is quite desirable for at least the moveable part of the swivel connection, the wheel and the brake to be constructed entirely of plastic so that the cost of fabrication can be minimized.

The invention may be described with greater clarity and particularity with reference to the accompanying drawings.

DESCRIPTION OF THE EMBODIMENT

Figure 1:
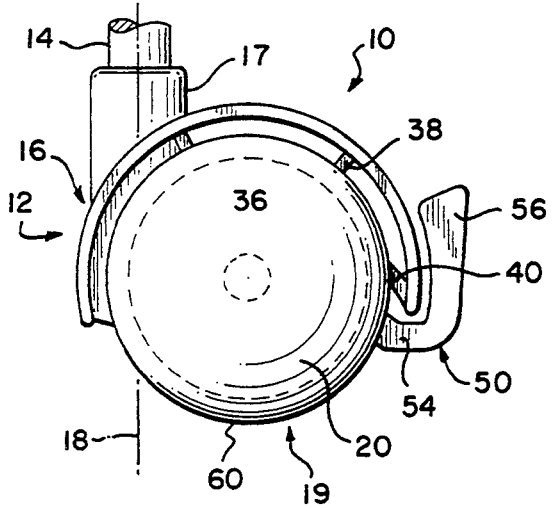
FIG. 1 is a side elevational view of a preferred embodiment of the improved caster according to the invention.

FIG. 1 illustrates an improved caster 10 according to the invention. The caster 10 includes a swivel indicated generally at 12 having a base element in the form of a cylindrical post 14 adapted for securement to a structure to be supported. The structure, for example, may be the leg of a baby crib or a hospital food serving tray stand. The swivel 12 also includes a moveable element 16 that has a body 42 from which a sleeve 17 extends. The sleeve 17 is mounted to the cylindrical base element 14 for rotation relative thereto about a vertical axis indicated at 18. A wheel assembly 19 includes a pair of wheels 20 and 22 mounted on a single metal axle 24. The wheels 20 and 22 are mounted to the moveable element 16 for rotation about an axis 26 that is always located in a horizontal plane. The wheels 20 and 22 rotate upon the axle 24.

Figure 3:
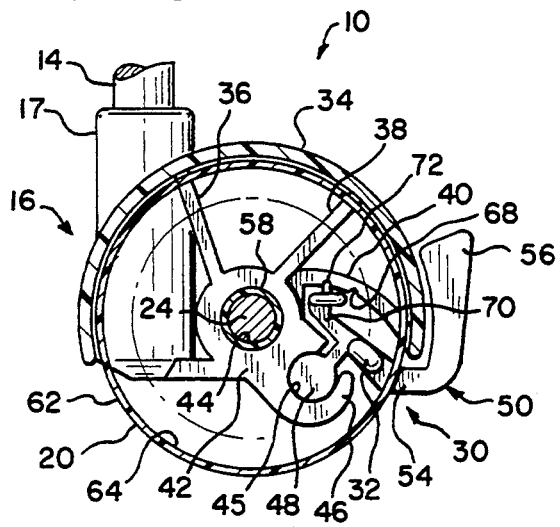
FIG. 3 is a sectional elevational view taken along the lines 3—3 of FIG. 2 showing the caster brake in a disengaged position.
Figure 4:
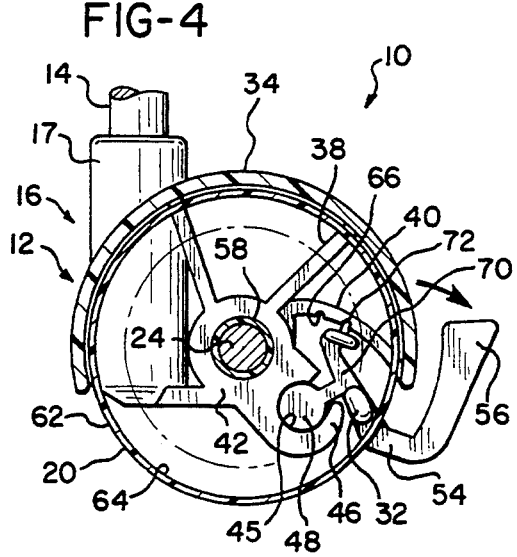
FIG. 4 is a sectional elevational view taken in the same plane as FIG. 3 showing the caster brake in an engaged position.
Figure 5:
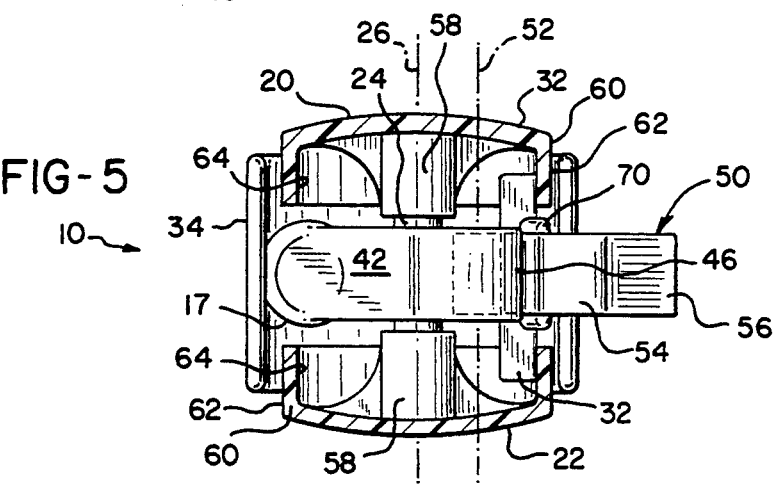
FIG. 5 is a bottom plan view with the caster wheels shown in section showing the caster brake engaged as in FIG. 4.

The improvement of the invention resides in the provision of a brake indicated generally at 30 in the drawings. The brake 30 is configured generally in the shape of a bellcrank and is engageable as shown in FIGS. 4 and 5, and disengageable as shown in FIGS. 1 and 3. The brake 30 alternatively restricts and permits rotation of the wheels 20 and 22 relative to the moveable swivel 12. The brake 30 includes a pair of brake pads 32 that are shiftable alternatively between positions of frictional engagement with the wheels 20 and 22, as illustrated in FIGS. 4 and 5, and positions of disengagement from the wheels 20 and 22, as best shown in FIG. 3.

The moveable or rotatable element 16 of the swivel 12 has an arcuate hood or shroud 34 that is supported on the body 42 by a plurality of radial webs 36, 38 and 40. The shroud 34 shields the operating components of the swivel 12, the brake 30, and the upper portions of the wheels 20 and 22. The webs 36, 38 and 40 extend radially outwardly from the body 42 of the rotatable element 16 of the swivel 12 to support the hood 34. The web 40 has an arcuate configuration and is disposed concave downwardly as illustrated in FIGS. 3 and 4. On the exposed underside of the web 40 there are two transverse detent grooves 66 and 68. The sleeve 17, the body 42, the webs 36, 38 and 40, and the hood 34 of the moveable element 16 of the swivel 12 are all formed as a single unitary, molded plastic structure.

The body 42 defines a cylindrical opening 44 therethrough which is adapted to receive and firmly grip the wheel axle 24. The body 42 also defines a concave channel 45 having an overhanging lip 46 that captures a generally cylindrical fulcrum shaft 48 that forms a part of the brake 30. The fulcrum shaft 48 is located at the end of a brake lever arm 50 that carries the brake pads 32. The fulcrum shaft 48 of the brake lever arm 50 is captured by the rotatable or moveable element 16 of the swivel 12 and is rotatably seated in the channel 45 formed within the body 42. The fulcrum shaft 48 rotates about a fulcrum axis 52 which is parallel to and displaced from the horizontal axis of rotation 26 of the wheels 20 and 22, as illustrated in FIG. 5.

The lever arm 50 has a free end 54 that projects outwardly beneath the hood 34. The free end 54 turns upwardly alongside the outside of the hood 34 and terminates in a thickened tip 56 which may be finger-actuated by a user.

Each of the wheels 20 and 22 is constructed with a hub 58 and a peripheral rim 60. Each rim 60 has a radially outermost rolling surface 62 and a radially innermost hidden surface 64. The rim 62 of each wheel projects from its hub 58 coaxially about the horizontal axis 26.

The brake 30 has a brake lever arm 50, a fulcrum cylinder 48, a detent connecting arm carrying 70, and a detent ridge 72. The detent ridge 72 is a transverse ridge that extends parallel to the fulcrum cylinder 48. The component parts of the brake 30 namely the brake lever arm 50, the fulcrum cylinder 48, the connecting arm 70, the detent ridge 72, and the brake pads 32 are all formed together as a single, a unitary molded plastic structure.

The wheels 20 and 22, the swivel connection 12 and the brake 30 are constructed entirely of plastic. The only metal article in the structure of the caster 10 is the wheel axle 24.

To assemble the caster of the invention, the metal axle 24 is forced into the cylindrical opening 44 in the body 42 where it is held immobile relative thereto. The fulcrum cylinder 48 of the brake 30 is then positioned in axial alignment with but longitudinally displaced from the channel 45 defined in the body portion 42 of the moveable element 16 of the swivel 12. The brake 30 is then moved longitudinally toward the body 42 thus forcing the fulcrum cylinder 48 into the channel 45. The lip 46 of the body 42 prevents the fulcrum cylinder 48 from being pulled laterally out of the channel 45 through the opening therein. Preferably, as the lever mechanism 50 is moved toward the body 42 the detent ridge 72 resides in registration with the detent groove 66 in the web 40. The wheels 20 and 22 are then forced onto the ends of the axles 24 and are engaged thereon for rotation therewith. Sockets in the wheel hubs 58 receive the ends of the axle 24. The assembled caster thereupon appears as depicted in FIGS. 1 and 2.

Figure 2:
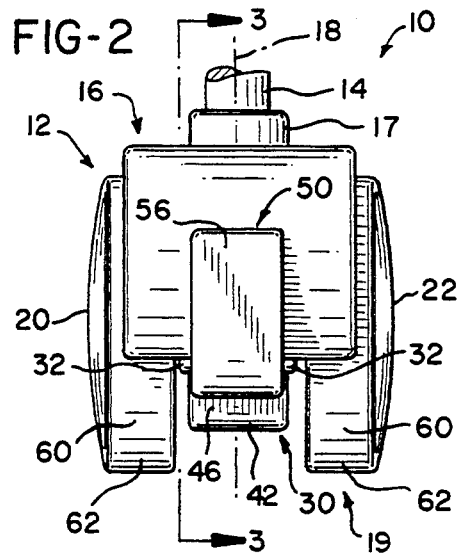
FIG. 2 is a front elevational view of the caster of FIG. 1.

In the operation of the brake 30, the caster wheels 20 and 22 can turn freely relative to the axle 24 and the moveable element 16 of the swivel 12 as long as the brake 30 is in the disengaged position of FIGS. 1, 2 and 3. While the lever arm 50 resides in the disengaged position with the detent ridge 72 latched in the detent groove 66, the brake pads 32 will be held radially inwardly and spaced a slight distance from the radially inwardly facing surfaces 64 of the wheel rims 62, as shown in FIG. 3.

When one desires to engage the brake 30, the brake actuating tip 56 of the brake lever arm 50 is pressed downwardly in a generally clockwise direction from the position of FIG. 3 to that shown in FIG. 4. This causes the brake lever arm 50 to rotate in a clockwise direction relative to the body 42. The fulcrum cylinder 48 is engaged loosely enough in the channel 45 so that all that is necessary is a force sufficient to deflect the resilient plastic detent connecting arm 70 so as to dislodge the detent ridge 72 from the detent groove 66. The connecting arm 70 is formed of a plastic sufficiently resilient to permit such a deflection. The finger engaging tip 56 is then pushed manually in a clockwise direction until the detent ridge 72 lodges in the detent groove 68 of the web 40. In this position the brake pads 32 are pressed tightly against the inner surfaces 64 of the wheel rims 60, as depicted in FIGS. 4 and 5. Thus, wheels 20 and 22 cannot turn due to the force of friction exerted thereon by the brake 30.

To release the brake 30, the actuating tip 56 of the lever arm 50 is merely pressed back toward the hood 34 from the position of FIG. 4 to the position depicted in FIGS. 1 and 3. That is, the lever arm 50 is rotated in a counter-clockwise direction about the fulcrum axis 52. The finger connecting arm 70 is sufficiently resilient so that the detent rib 72 dislodges from the detent groove 68, thus allowing the counter-clockwise rotation of the lever arm 50. When the detent rib 72 reaches the detent groove 66, it engages therewith, thereby holding the brake 30 in the disengaged position. As a result, the wheels 20 and 22 can again turn freely relative to the moveable element 16 of the swivel 12 and the axle 24.

The brake 30 thereby forms a simple but very inexpensive brake mechanism to allow a user to selectively immobilize the wheels of casters from rotation, or allow the caster wheels to rotate freely. Undoubtedly numerous variations and modifications of the invention will become readily apparent to those familiar with casters and their construction. For example, the brake need not necessarily employ a rotatable lever, but could employ a brake pad mounted upon a toggle or slide. Also, the positions of the detent ridge 72 on the brake lever 50 and the detent grooves 66 and 68 in the web 40 could be reversed. Numerous other modifications and minor changes and adaptations to particular caster constructions are also possible. Accordingly, the scope of the invention should not be construed as limited to the specific embodiment illustrated herein.

We claim:

1. An improvement to a caster having a wheel mount that defines a horizontal wheel axis and a fulcrum seat defining a fulcrum axis that is radially displaced from and extends parallel to said horizontal wheel axis, and a wheel carried by said wheel mount for rotation about said horizontal wheel axis, wherein said wheel is constructed with a hub and a rim having an outer rolling surface and a radial inner surface, said rim projecting horizontally from said hub coaxially about said horizontal wheel axis, and wherein said wheel mount includes a continuous shroud that covers the upper portion of said rim, and at least one web that projects radially outwardly relative to said horizontal wheel axis to thereby support said shroud upon said wheel mount in spaced radial separation from said horizontal wheel axis, comprising a unitary brake structure formed with a solid, cylindrical fulcrum shaft captured by said fulcrum seat so as to be rotatable about said fulcrum axis, a brake lever arm extending outwardly from said fulcrum shaft and having a first end joined to said fulcrum shaft and an opposite free end, a brake pad carried on said brake lever arm at said first end thereof at a first radial distance of separation from said fulcrum axis, a detent carrying arm joined to said fulcrum shaft, detent means disposed on said detent carrying arm at a second radial distance from said fulcrum axis greater than said aforesaid first radial distance from said fulcrum axis, and wherein said web defines thereon a pair of detent recesses located at different radial distances from said horizontal wheel axis, and wherein said free end of said brake lever arm projects outwardly beyond said wheel rim, beneath said shroud, and upwardly alongside said shroud externally thereof, and said free end of said brake lever arm ends in a tip that is located at a third radial distance from said fulcrum axis, wherein said third radial distance is greater than the aforesaid second radial distance, whereby downward force on said tip of said free end of said brake lever causes said detent means to engage a first of said detent recesses and concurrently force said brake pad into frictional engagement with said inner surface of said wheel rim, and upward force on said brake lever tip engages said detent means in said other detent recess and concurrently withdraws said brake pad from frictional engagement with said inner surface of said wheel rim.

2. The improved caster according to claim 1 wherein said wheel mount, said wheel and said brake are all formed entirely of plastic.

3. A caster for providing rolling support for a structure comprising: a wheel mount that defines a horizontal wheel axis and a fulcrum seat defining a fulcrum axis that is radially displaced from and extends parallel to said horizontal wheel axis, a wheel carried by said wheel mount for rotation about said horizontal wheel axis, wherein said wheel is constructed with a hub and a rim having an outer rolling surface and a radial inner surface, said rim projecting horizontally from said hub coaxially about said horizontal wheel axis, and wherein said wheel mount includes a continuous shroud that covers the upper portion of said rim, at least one web that projects radially outwardly relative to said horizontal wheel axis to thereby support said shroud upon said wheel mount in spaced radial separation from said horizontal wheel axis, and said web defines thereon a pair of detent recesses located at different radial distances from said horizontal wheel axis, a unitary brake structure formed with a solid, cylindrical fulcrum shaft captured by said fulcrum seat so as to be rotatable about said fulcrum axis, a brake lever arm extending outwardly from said fulcrum shaft and having a first end joined to said fulcrum shaft and an opposite free end, a brake pad carried on said brake lever arm at said first end thereof at a first radial distance of separation from said fulcrum axis, a detent carrying arm joined to said fulcrum shaft, detent means disposed on said detent carrying arm at a second radial distance from said fulcrum axis greater than said aforesaid first radial distance from said fulcrum axis, and wherein said free end of said brake lever arm projects outwardly beyond said wheel rim, beneath said shroud, and upwardly alongside said shroud externally thereof, and said free end of said brake lever arm terminates in a tip that is located at a third radial distance from said fulcrum axis, wherein said third radial distance is greater than the aforesaid second radial distance, whereby downward force on said tip of said free end of said brake lever causes said detent means to engage a first of said detent recesses and concurrently force said brake pad into frictional engagement with said inner surface of said wheel rim, and upward force on said brake lever tip moves said brake so as to engage said detent means in said other detent recess and concurrently withdraw said brake pad from frictional engagement with said inner surface of said wheel rim.

4. A caster according to claim 3 in which said rotatable element of said wheel mount, said wheel and said brake are constructed entirely of plastic.

5. In a caster having a wheel mount that defines a horizontal wheel axis and a fulcrum seat defining a fulcrum axis that is radially displaced from and extends parallel to said horizontal wheel axis, and a wheel carried by said wheel mount for rotation about said horizontal wheel axis, wherein said wheel is constructed with a hub and a rim having an outer rolling surface and a radial inner surface, said rim projecting horizontally from said hub coaxially about said horizontal wheel axis, and wherein said wheel mount includes a continuous shroud that covers the upper portion of said rim, and at least one web that projects radially outwardly relative to said horizontal wheel axis to thereby support said shroud upon said wheel mount in spaced radial separation from said horizontal wheel axis, the improvement comprising a unitary brake structure formed with a solid, cylindrical fulcrum shaft captured by said fulcrum Seat so as to be rotatable about said fulcrum axis, a brake lever arm extending outwardly from said fulcrum shaft and having a first end joined to said fulcrum shaft and an opposite free end, a brake pad carried on said brake lever arm at said first end thereof a first radial distance of separation from said fulcrum axis, a detent carrying arm joined to said fulcrum shaft, detent means disposed on said detent carrying arm at a second radial distance from said fulcrum axis greater than said aforesaid first radial distance from said fulcrum axis, and said web defines thereon a pair of detent recesses located at different radial distances from said horizontal wheel axis, and wherein said free end of said brake lever arm projects outwardly beyond said wheel rim, beneath said shroud, and upwardly alongside said shroud externally thereof, and said free end of said brake lever arm has a tip that is located at a third radial distance from said fulcrum axis wherein said third radial distance is greater than the aforesaid second radial distance, whereby downward force on said tip of said free end of said brake lever causes said detent means to engage a first of said detent recesses and concurrently force said brake pad into frictional engagement with said inner surface of said wheel rim, and upward force on said brake lever tip moves said brake so as to engage said detent means in said other detent recess and concurrently withdraw said brake pad from frictional engagement with said inner surface of said wheel rim.

6. A caster according to claim 5 wherein said wheel mount is comprised of a swivel with a base element adapted for securement to a structure to be supported and a moveable element mounted to said base element for rotation relative thereto about a vertical axis.

* * * * *